INVENTOR.
ANDREW VAN LEEUWEN
BY
Kendrick, Subkow & Stolzy
ATTORNEYS

United States Patent Office 3,439,258
Patented Apr. 15, 1969

3,439,258
CALIBRATION CIRCUIT FOR TRANSDUCERS
Andrew Van Leeuwen, Los Angeles, Calif., assignor to Statham Instruments, Inc., Los Angeles, Calif., a corporation of California
Filed Aug. 29, 1966, Ser. No. 575,649
Int. Cl. G01r 17/10
U.S. Cl. 323—75                                           4 Claims

ABSTRACT OF THE DISCLOSURE

A Wheatstone resistance bridge circuit, having one or more legs modifiable by an externally-applied stimulus, has a pair of input terminals connected to a source of excitation potential and a pair of output terminals, the latter being connected to a differential amplifier with cross-feedback. A voltage divider arranged across the excitation source provides a calibration potential to an output terminal of the bridge. A further aspect of the disclosure is the provision of a calibration resistor which can be selectively interconnected between one input terminal and one output terminal and is substituted for the voltage divider.

---

Figure 1:
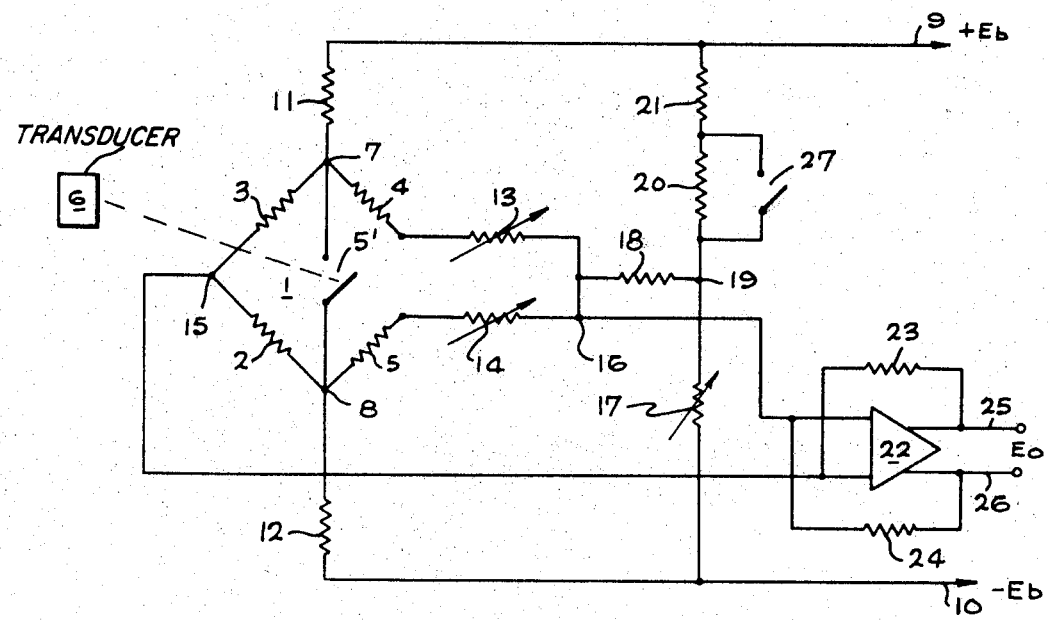

This invention relates to a method of and circuit for calibration of a transducer whose sensing element is a resistive bridge. Such sensing elements, employing strain sensitive wire whose resistance changes with strain imposed thereon, art well known in this art.

In such transducers the bridge may have one, two, three or four active arms in the sense that their resistance changes with the mechanical stimulus which is imposed on the transducer. It is frequently necessary to check the calibration of the transducer to be sure that the magnitude of the signal output of the transducer, as a function of the magnitude of the stimulus which results in such signal, remains unchanged and that the bridge and the readout systems are functioning properly. Such systems are well known and are referred to as shunt calibration systems. This check is accomplished by removing the load and placing a resistor in shunt across one of the active arms. In normal operation, when the mechanical stimulus is applied, the shunt calibration resistor is not connected to the bridge. The magnitude of the shunt resistor is related to the bridge resistance, the calibration factor, and the number of units of mechanical input to be simulated by the calibrating shunt resistor. The calibration factor is defined as the volts or microvolts open circuit output of the bridge per volt input per unit of mechanical stimulus applied.

Where the transducer is in an inaccessible location, the shunt calibration resistor and the switch which connects the shunt calibration resistor to the bridge must be connected by transmission lines. An error is introduced by the transmission line resistance. If these values are known, they may be taken into account in determining the value of the calibration resistor required to give the desired value of the simulated output. In such case, when the simulated output is obtained, equal to the output obtained when the specified fraction of the maximum stimulus for which the transducer is designed is applied to the transducer, the test will show that the transducer of the bridge and the readout circuit are functioning as designed.

However, when the transmission line resistances cannot be determined, or the stimulus may not be removed at will, such calibration methods are not suitable.

This invention relates to and has for its object a shunt calibration system which will permit the calibration of the transducer without introducing a substantial transmission line resistance error arising from the connections between the shunt calibration resistor and the bridge.

It is an object of my invention to devise a shunt calibration system for a transducer without requiring the removal of the stimulus to obtain an accurate simulated output which is independent of the magnitude of the stimulus applied to the transducer.

I accomplish these objectives by placing the shunt calibration resistor in close proximity to the bridge, and thus eliminate the transmission line resistance in practical effect. The shunt calibration resistor is always in the circuit both at zero stimulus and at all other finite value of the stimulus. The shunt calibration resistor is connected between an input corner and an output corner of the bridge. A switch is placed across the input corners of the bridge. The calibration resistor is made one leg of a fixed voltage divider whose resistance ratio is related to the calibration factor desired and the number of units of mechanical input to be simulated by the calibrating shunt resistor.

The system in its normal operation operates with the switch in open condition. To calibrate the system, the switch is closed, while the stimulus imposed on the bridge to cause the bridge to unbalance is maintain. On closing the switch, the voltage output is that produced by the calibration resistor only and is not affected in substantial degree by the bridge unbalance.

The value of the unbalanced voltage, when the switch is closed, will calibrate the bridge to determine the calibration factor. The system not only will calibrate the bridge as described above, but will also indicate any breakage or short circuit in any of the bridge legs. This will be indicated by a large change in the calibration factor, i.e., the voltage output of the bridge. The two input corners of the bridge are brought to substantially the same voltage, and the total current flow from one input corner to the other output corner is reduced to a very small value, as will be more fully described below.

It is one of the advantages of my invention that, by shorting the input across the corners of the bridge, substantially no current flows in the bridge, and the bridge unbalance has a negligible influence in the potential across the output corners.

The current flow through the bridge, which forms the excitation current, is thus reduced to a very small value, so that it has but a minimal influence upon the potential difference between the output corners established by the calibration resistor and the associated resistances.

The output of the bridge with the switch closed is substantially independent of the stimulus applied, since the output of the bridge, whose resistances are modified by a stimulus, depends not only on the magnitude of the stimulus but also upon the magnitude of the excitation current circulating through the bridge from the excitation source. The voltage output at the output corners of the bridge with the switch closed thus is independent of the applied stimulus and depends on the magnitude of the calibration resistor and other associated resistances, all of which are not affected by the applied stimulus.

Figure 2:
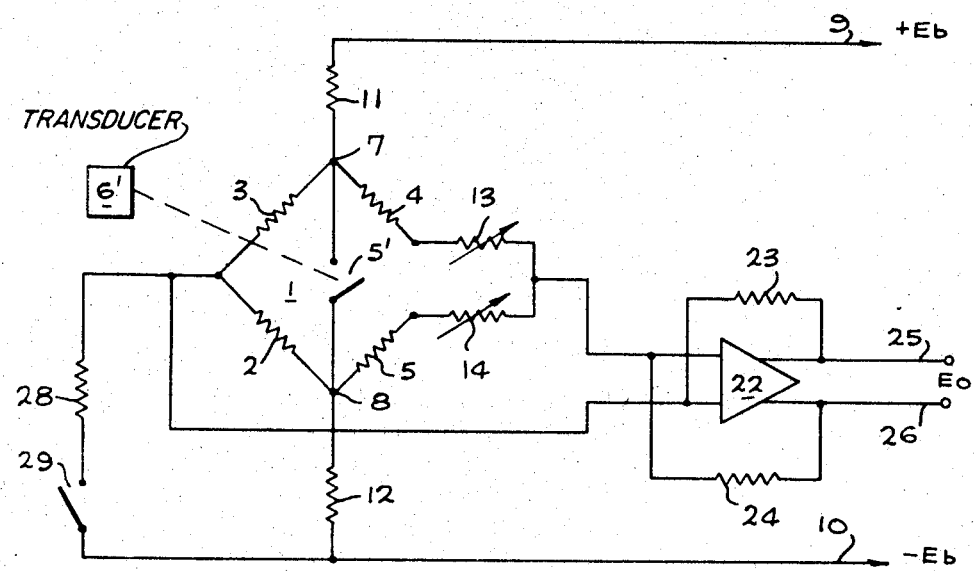

These and other objects of my invention will be more fully described in connection with the drawings of which:

FIGS. 1 and 2 are schematic diagrams showing embodiments of my invention.

The bridge 1 is composed of four resistances 2, 3, 4 and 5. Resistors 2 and 3 are of the same resistance, and 4 and 5 of the same resistance, when no stimulus is applied to the bridge by the condition responsive element of the transducer 6. Such transducers and bridges are described in many patents issued to Louis D. Statham, for example, Patent 3,058,348 and the patents referred to therein. The transducer may be of the film type, such as is shown in the Stedman Patent 3,071,745.

The bridge is connected at its input corners 7 and 8 to a source of excitation potential applied at 9 and 10. As is conventional in such bridges, this is usually a constant voltage source. As shown in the drawings, the positive pole 9 is connected through resistance 11 to the input corner 7, and the negative pole 10 through the resistor 12 to the opposite input corner 8. The bridge is balanced by means of the resistors 13 and 14.

The output from the bridge is taken across the output corners 15 and 16. The shunt calibration resistor 17 is connected through resistor 12 to the input corner 8 and through resistor 18 to the output corner 16. The resistor 18 is connected between the output corner 16 and the intermediate point 19 of the voltage divider of which 17 is one leg. The lower leg 17 is connected to 10 and to the upper leg composed of the series resistors 20 and 21 connected between 19 and 9. A switch 5' is connected between 7 and 8.

The output is amplified in an amplifier 22 provided with negative feedback resistances 23 and 24, connected to the output terminals 25 and 26 and cross-connected to the amplifier input terminal, positive to negative, as is fully described in the Price and Curtis Patent No. 3,161,-821, to which reference may be had for a full description of such amplification systems.

As will appear, all temperature and balance compensation resistors have been omitted for purposes of simplification, and may be used as is conventional in this art, and as will be understood by those skilled in this art.

In the circuit of FIG. 1, the bridge with the switch 5' open is initially balanced at zero load, by adding suitable resistance 13 or 14 or both to the two adjacent legs of the bridge, 4 and 5, as is conventional in this art. Temperature and compensating resistors may also be added in the output or input circuit, or both. The bridge is assumed to be so compensated.

The resistances 17, 18, 20 and 21 have a much higher resistance than the bridge resistance, for example, from 30 to 40 times the resistance of the bridge.

The switch 5' being open, the resistor 13 or 14 or both are varied to unbalance the bridge sufficiently to produce a voltage output from the bridge, measured at 25 and 26, which approximates the desired calibration voltage but with opposite polarity. The bridge is subsequently brought to balance by adjusting resistor 17. The switch 5' is then closed, and this will unbalance the bridge with opposite polarity to that of the previous unbalance.

Resistor 17 is adjusted to produce the desired calibration voltage at 25 and 26. The switch is opened, and the bridge again balanced at zero stimulus with resistor 13 or 14.

A switch 27 is placed across resistor 20 to permit of a second level of calibration factor, as will be described below.

When the stimulus is applied to the bridge or the calibration resistor in the circuit, the net resistance of adjacent arms is changed to increase the effective resistance of one and reduce the resistance of the adjacent arm without, however, changing the total resistance of the bridge. With switch 5' open, a potential difference occurs between 15 and 16, as a result of a bridge unbalance. When the feedback resistors 23 and 24 are not used, an amplified open loop unbalance voltage at 25 and 26 may be read or recorded. When the feedback system including resistors 23 and 24 is used, the feedback rebalances the bridge substantially so that, with the stimulus applied, the voltage at 15 and 16 is substantially equal. The voltage across the amplifier output at 25 and 26 is greater than the amplified open loop potential difference at 25 and 26, because of the gain of the system, as is fully described in said Patent No. 3,161,821.

To calibrate the bridge and the readout circuit, including any amplifier, meters, recorders or telemetering equipment employed, switch 5' is closed. With the bridge shorted and the resistances 11 and 12 equal, the potential across 15 and 16 depends only on the ratio of the above resistances and the ratio of the resistance of 17 to the sum of the resistances 20 and 21 and the gain of the system when employing the feedback resistors 23 and 24.

Since the bridge resistance is constant and independent of the relative resistances of the resistors 2, 3, 4 and 5, varied by the applied stimulus, the open loop output at 15 and 16 is independent of the stimulus, and the calibration may be affected whether or not the stimulus is applied.

When the switch is closed, the output voltage of the amplifier reports the calibration voltage. This will indicate that the bridge is not damaged and that the bridge and all of the circuit elements are functioning properly. If, however, the bridge is shorted, or one of the legs is broken, or the circuit elements are malfunctioning, the gain is materially altered. In addition, the resistance in the feedback path is altered, thus creating a differential error voltage indicating a defective bridge. Thus, a large change in the output of the amplifier occurs when the switch is closed, and this will be an alarm signal.

As stated above, the voltage at 19, with the switch 5' closed, is proportional to the ratio of the resistances of the voltage divider, and is proportional to the number of units of mechanical stimulus to the bridge transducers, which it is to simulate.

Thus, by providing a switch 27 to short resistor 20, the potential at 19 may be made more positive, to increase the calibration voltage and the equivalent mechanical stimulus.

The resistances of 20 and 21 may be increased by introducing resistances, as will be understood by those skilled in the art, or this will reduce the calibration voltage, due consideration being given to the resistances of lines connecting the switch 27 to the circuit.

One of the great advantages of this system is that the switches 5' and 27 may be positioned adjacent the bridge input corners and, if desired, may be actuated by remote control.

Another advantage of the system, which is important irrespective of the location of the switch, is that the system may be calibrated while the stimulus is applied.

A further advantage of the system is that it is possible to compensate negative and positive temperature coefficients by inserting temperature-sensitive resistors in series with either resistor 21 or resistor 17. The temperature-sensitive resistor may be part of resistor 21 or resistor 17. Also, only a single switch contact is required to effect a single point calibration.

FIG. 2 shows an alternative circuit for obtaining the desired calibration without interrupting the application of the stimulus. All parts numbered as in FIG. 1 have the same significance in FIG. 2 as in FIG. 1. FIG. 2 differs from FIG. 1 by substituting for the resistor net 17, 18, 20 and 21 a shunt calibration resistor 28, shunt connected across resistor 12 and arm 2 of the bridge. A switch 29 is introduced in series with the resistor 28. The switch, like switch 5', may be placed close to the bridge and operated by remote control, if desired. In operating condition, switches 5' and 29 are open.

To calibrate the circuit while the condition responsive device 6 maintains an unbalanced condition of the resistors 2, 3, 4 and 5, switches 5' and 29 are closed, while the excitation voltage is impressed between 9 and 10. The output voltage across 25 and 26 will depend only on the total resistance of the bridge 1 and the fixed resistors 11, 12 and 28.

As in the previous form, if the bridge is shorted or one of the legs is broken, or the circuit elements malfunction, the gain is materially altered. Similarly, the resistance in the feedback path is altered, creating a differential error voltage indicating a defective bridge.

The circuit of FIG. 2 has fewer components than that of FIG. 1. It has the disadvantage that two switches are required for calibration. However, temperature compensation is simpler and can be accomplished by making resistor 28 in part a resistor with a substantial positive temperature coefficient of resistivity, all other resistors in the circuit being substantially passive resistors.

In the circuit of FIG. 2, where resistors having a positive coefficient of resistivity are used as described above, the sensitivity of the circuit, that is, the volts output per volt input to the bridge per unit of stimulus, is independent of the magnitude of the calibration resistor and independent of any zero temperature compensation such as is used in bridge circuits of the period art. See, for example, Baker Patent 3,111,620; Perino Patent 3,085,193; and Perino application Ser. No. 189,620, filed Apr. 23, 1962.

However, in the circuit of FIG. 1, zero compensation resistors and the compensation resistor in series with resistor 28 are interdependent and must be adjusted together. Sensitivity compensation is independent of the other compensations.

While either of the systems shown in FIG. 1 and FIG. 2 may be employed, my present preference is for the system of FIG. 2.

I claim:

1. A Wheatstone bridge calibration circuit which comprises a Wheatstone bridge, said bridge including a pair of opposite input terminals connected to a source of excitation voltage, a pair of opposite output terminals for said bridge, a switch connected between said input terminals to short said input terminals when the switch is closed, and a shunt calibration resistor connected between one of said input terminals and one of said output terminals.

2. In the circuit of claim 1, a switch in series with said shunt calibration resistor.

3. In the circuit of claim 1, a second resistor in series with said shunt calibration resistor and the other output terminal.

4. In the circuit of claim 3, means to short out said second resistor.

References Cited

UNITED STATES PATENTS

| | | | |
|---|---|---|---|
| 3,046,782 | 7/1962 | Laimins | 73—141 |
| 3,319,155 | 5/1967 | Kooiman et al. | |
| 3,348,415 | 10/1967 | Ash | 73—362 |

OTHER REFERENCES

Basic Electrical Measurements by Melville B. Stout, pp. 105–106 relied upon, 2nd printing 1961 by Prentice-Hall, Inc.

JOHN F. COUCH, *Primary Examiner.*

G. GOLDBERG, *Assistant Examiner.*

U.S. Cl. X.R.

324—74, 62